United States Patent [19]

Peerts et al.

[11] 4,025,495

[45] May 24, 1977

[54] PREPARATION OF ORGANIC POLYSULFIDE POLYMERS USING HEAVY RESIDUES FROM VINYLCHLORIDE MANUFACTURE

[75] Inventors: Fernand Peerts, Heverlee; Yvon DeLaunois, Tessenderlo, both of Belgium

[73] Assignee: Tessenderlo Chemie S.A., Tessenderlo, Belgium

[22] Filed: July 7, 1975

[21] Appl. No.: 593,385

[30] Foreign Application Priority Data

July 11, 1974   France ............................ 74.24082

[52] U.S. Cl. .......................... 260/79.1; 260/33.6 R; 260/33.8 R; 260/37 R; 260/79; 427/388 R; 428/450
[51] Int. Cl.² ........................................ C08G 75/16
[58] Field of Search ................ 260/79.1, 79, 37 R, 260/33.6 R, 33.8 R

[56] References Cited

UNITED STATES PATENTS

| | | | |
|---|---|---|---|
| 2,466,963 | 4/1949 | Patrick et al. | 260/79.1 |
| 3,111,545 | 11/1963 | Nobis et al. | 260/79.1 |

*Primary Examiner*—Melvyn I. Marquis
*Attorney, Agent, or Firm*—Millen & White

[57] ABSTRACT

A process for abating a waste disposal problem in the manufacture of vinyl chloride wherein 1,2 dichlorethane is an intermediate and a heavy residue is recovered as still bottoms, said process comprising reacting said heavy residue at 50° to 100° C., in aqueous medium with an alkali metal or an alkaline earth metal polysulfide, the proportion of polysulfide being equal at least to 30% by weight of the molar theoretical quantity, the average sulfur rank of polysulfide being more than 1 and up to and including 5, the pH of the reaction medium not exceeding 10.5 when the reaction is completed, and the obtained precipitate being separated from the reaction mother liquor, said precipitate being valuable organic polysulfide polymers containing 4–80% by weight of sulfur.

16 Claims, No Drawings

PREPARATION OF ORGANIC POLYSULFIDE POLYMERS USING HEAVY RESIDUES FROM VINYLCHLORIDE MANUFACTURE

BACKGROUND OF THE INVENTION

This invention relates to a waste disposal problem and to the preparation of organic polysulfide polymers by using heavy residues derived from the manufacture of vinyl chloride.

Industrially, vinyl chloride is prepared according to numerous processes which use mainly ethylene, acetylene or a mixture of ethylene and acetylene as starting materials. Whatever the type of reaction used, chlorination or oxychlorination, in processes using ethylene there is formed the intermediate 1,2 dichloroethane (also called ethylene dichloride or EDC) which is then pyrolysed or dehydrochlorinated in alkaline medium in order to obtain vinyl chloride. Mixtures of organic chlorinated products which are the heavy residues of the manufacture of vinyl chloride are obtained as still bottoms during the purification by distillation of dichloroethane (see for example Kirk Othmer Encyclopedia of Chemical Technology 2nd edition Vol. 5 p. 175, l 26 and Riegel's Handbook of Industrial Technology page 784 FIG. 25.9). Heavy residues are also obtained as still bottoms from the vinyl chloride fractionation, optionally after recovering of dichloroethane by distillation, (see for example Kirk Othmer Encyclopedia of Chemical Technology 2nd Edition Vol. 5 p. 175 l 40). The term "heavy residues" is thus used to designate mixtures of chlorinated compounds which are liquids at normal pressure, which are recovered as said still bottoms in plants producing vinyl chloride and are usually discarded.

The analysis of numerous heavy residues obtained from several plants has shown that the chlorinated aliphatic products having a short carbon chain constitute the predominant part of these mixtures. In particular, the total amount of 1,2-dichloroethane, 1,1,2-trichloroethane, 1,1,2,2-tetrachloroethane and 1,1,1,2-tetrachloroethane generally ranges between 40 and 70% by weight based on the whole quantity of the chlorinated compounds, but this amount may be greatly increased and may be as high as 90% by weight under extreme plant operating conditions. The respective percentages of each of these four constituents may greatly vary, and for example the percentage of 1,2-dichloroethane may be comprised within 2 and 70% by weight based on the weight of the heavy residues.

The other products which are in the residues are different aliphatic compounds having 1 to 4 carbon atoms and aromatic and cycloaliphatic compounds. Among these aliphatic compounds, the following products generally occur: chloroform, carbon tetrachloride, chloroethanol, chloromethylether, chloral, 1,1-dichloroethane, trichloroethylene, tetrachloroethylene, chloropropanes, chloropropenes, dichloropropanes, dichloropropenes, trichloropropenes, chloroprene, and its dimer, chlorobutenes, dichlorobutenes and dichlorobutanes. Among aromatic and cycloaliphatic compounds, following products can occur: chlorobenzene, dichlorobenzenes, chloroxylenes (xylyl chloride), trimethylbenzenes, dichlorocyclohexadienes. Actually, the relative percentages of these compounds can be greatly varied, because they depend on numerous factors: in particular the purity of used ethylene for the preparation of dichloroethane, the operation of the vinyl chloride plant, and the origin of the chlorine or hydrogen chloride used for chlorination or oxychlorination. Brominated and chlorobrominated organic compounds such as bromochloroethane, bromochloroethylene, dibromoethane, dibromoethylene or mineral chloride such as hydrogen chloride or molecular chlorine can be also found in these residues.

According to the present invention the heavy residues are defined by the chlorine content which is of an organic origin and which is contained in the heavy residues, the content of chlorine which is of a mineral origin being of minor importance and, in any case, being lower than 1% by weight. Analyses of numerous residues have shown that the amount of chlorine of organic origin (in order to simplify the term organic chlorine is used hereunder to designate the chlorine having an organic origin) ranges between 55 and 80% by weight based on the weight of the heavy residues.

Heretofore, these heavy residues had never been commercially utilized and constituted a serious waste disposal problem. Since polyvinylchloride is manufactured up to now they were stored and destroyed by combustion in the presence of fuel-oil, on special boats off shore. This type of treatment, however, has many disadvantages; in particular it increases the cost of the vinyl chloride production on the one hand, and increases atmospheric pollution owing to hydrogen chloride formed by combustion on the other hand.

SUMMARY OF THE INVENTION

An object of the present invention is to utilize the heavy residues as a reactant for the production of organic polysulfide polymer compositions which can be used in a wide variety of applications, such as sealing compounds, coatings, paints and polysulfide elastomers.

Upon further study of the specification and appended claims, further objects and advantages of this invention will become apparent to those skilled in the art.

It is known that organic polysulfide polymers are obtained by reacting a mineral polysulfide, in particular an alkali metal or alkaline-earth metal polysulfide with an organic aliphatic dihalogenated compound such as for example dichloroethane, ethylene dichloride, dichloropropane, propylene dichloride, dichloroethyl ether, dichloroethyl formal, or triglycol dichloride (I.E.C. Nov. 1950, p. 2217). Polysulfide polymers have also been prepared by using mixtures of various dihalides described hereabove, or mixtures of these dihalides with small amounts and/or definite quantities of mono, tri or tetrahalides (I.E.C. Nov. 1950, p. 2218, Journal of Chem. Ed., Jan. 1965, P. 6). Generally the reaction is carried out in aqueous medium at normal pressure and at temperature lower than 100° C. The obtained polymer is usually treated with sodium hydrosulfide (NaHS) and sodium sulfite ($Na_2SO_3$) (Industrial and Engineering Chemistry, Feb. 1951 Vol. 43 No. 2, p. 325) before being used.

It has also been proposed to use aromatic dihalogenated compounds in order to produce organic polysulfide polymers, but it was necessary to carry out the reaction at high temperature and high pressure and by using as starting products, compounds which are activated by the presence of radicals, for example nitro radicals (Journal Org. Chem. 13, 1948, P. 154, U.S. Pat. No. 2,195,380, Example 8).

According to the present invention, polysulfide polymers which are quite useful are obtained without it being necessary to use pure starting products or mixtures of pure products with definite ratios, it being unexpectedly discovered that the complex mixtures of the heavy residues from the manufacture of vinyl chloride lead to surprisingly excellent organic polysulfide polymers. In particular, it has been found that organic polysulfide polymers can be produced despite the presence of relatively large amounts of tri and tetrahalogenated compounds and aromatic chlorinated compounds in the heavy residues of the present invention, and without any requiring special methods to produce the polymers. Furthermore these polymers do not react with NaSH and $Na_2SO_3$ and can be used directly.

According to the present invention, polysulfide polymers containing from 4 to 80% by weight of sulfur are obtained by reacting, in aqueous medium at temperatures of 50° to 100° C., a heavy residue from the vinyl chloride manufacture with an alkali or an alkaline earth polysulfide, the amount of mineral polysulfide used being at least equal to 30% by weight of the molar theoretical quantity, the average sulfur rank of mineral polysulfide being above 1 and up to and including 5, the pH range of the reaction medium not exceeding 10.5 when the reaction is completed, and separating the obtained precipitated polymer from the reaction liquor.

When operating with such conditions, polysulfide polymers containing less than 15% by weight of chlorine and generally between 5 and 15% by weight are obtained. Moreover, it has been found that these chlorine amounts are not detrimental to the applications of these polymers but on the contrary can in many cases provide fire-proofing properties.

According to the present invention, the stoichiometric amount of mineral polysulfide (alkali or alkaline earth) is defined as being the required amount for two atoms of alkali metal (or one atom of alkaline earth metal) to correspond with two atoms of chlorine present in the heavy residue. When using an amount of mineral polysulfide lower than the stoichiometric amount, i.e. an insufficient amount in order for the whole organic chlorine present in the heavy residue to be reacted for the production of the polymer, part of the organic chlorine which does not react is eliminated and the obtained polymer contains a low amount of chlorine. It is possible, but it is only an assumption, that the chlorinated organic derivatives are hydrolyzed in part, and that this hydrolysis produces hydrogen chloride which is solubilized in the mother liquor. By using an amount of mineral polysulfide lower than 30% by weight of the stoichiometric amount, the chlorine is eliminated in an insufficient amount and there are obtained polymers containing low amounts of sulfur and large amounts of chlorine. Furthermore, important amounts of heavy residues do not react.

There are no particular drawbacks when amounts of mineral polysulfide higher than the stoichiometric amount are used, but for economic reasons, it is preferable to use an amount of mineral polysulfide which does not exceed 200% by weight of the molar theoritical quantity.

According to the present invention, the mineral polysulfides (alkali or alkaline earth) suitable for the treatment of the heavy residues are obtained according to any known techniques by reaction of sulfur with an alkali or alkaline earth hydroxide, metal or sulfide. Generally, sodium sulfide is used for economic reasons and in order to simplify the description of the products are particularly mentioned hereunder, but the other alkali or alkaline earth polysulfides can also be used for the reaction. Sodium polysulfides have the formula $Na_2 S_x$ wherein $x$ is the rank of sulfur: for example $Na_2 S_4$ has a rank of sulfur of 4.

According to the present invention, alkaline polysulfides containing various amounts of impurities can be used without any drawbacks, in particular sodium polysulfides obtained by the reaction of sulfur with technical sodium sulfide and which contains small amounts of sodium hydrosulfide, sulfite, carbonate, hydroxide, thiosulfate and polysulfides. The suitable amounts of technical sulfide are found by using an iodometric titration and as $Na_2S$.

When the reaction is completed, the pH of the reaction mixture must not exceed 10.5 and when the reaction is achieved without any dispersing agent, it is preferable to carry out the reaction at pH not exceeding 9.5. It has been found that the amount of obtained polymers and the sulfur content of these polymers decreases notably, when the pH exceeds 9.5. The pH of the reaction mixture depends essentially on the quantity and the composition of the used mineral polysulfides. When the used amount of mineral polysulfides is lower than the stoichiometric amount, the pH at the end of reaction can decrease to about 6 or less, this decreasing being without any disadvantages because the reaction mixture must be acidified in order to coagulate the obtained polymer. When mineral polysulfides containing hydrosulfide as impurities are used, the pH of the reaction mixture stabilizes by itself to below 10.5 at the end of the reaction. On the contrary, when mineral polysulfides contain impurities such as carbonate or hydroxide, it is necessary to adjust the pH by adding an acid, as for example hydrogen sulfide, or preferably hydrogen chloride.

In the practice of the invention, the heavy residue and the mineral polysulfide solution are mixed at temperatures of 50° to 80° C. Preferably an alkaline polysulfide solution at temperatures in the range of 60°–70° C. is used as starting product, and the heavy residue is added to this solution. The reaction of the residue is exothermic and the temperature of the reaction mixture is increased up to about 70°–85° C. The heavy residue is introduced by stirring in 5 minutes to 2 hours, for example, preferably in 10 to 30 minutes. Then, the reaction mixture is heated and maintained at 90°–100° C. by stirring for 1 to 5 hours in order to achieve a complete reaction. The precipitate of polymer containing absorbed reaction mother liquor is separated, and water-soluble impurities are eliminated according to any suitable technique such as repeated washing, filtration decantation and successive reslurrying. Then the polymer is coagulated by slurrying with water and acidification to a pH below 5 by addition of a dilute solution of hydrogen chloride, sulfuric or acetic acid. The precipitate thereby obtained is separated and liberated of supernatant water by any suitable means such as mixing, or mastication, and then it is dried.

According to another embodiment of the process of the invention, the reaction of the sodium polysulfide with the heavy residue is achieved in the presence of a dispersing agent. The resultant polymeric precipitate is then obtained in a very finely divided form and is in dispersion in the reaction medium; owing to this finely divided form, the polymer precipitate may be treated in an easier way. Metallic gelatinous hydroxides such as ferrous, aluminum or preferably magnesium hydroxides are preferably used as dispersing agents. Generally, the dispersing agent is prepared in situ, in the aqueous solution of mineral polysulfide before the heavy residue is added; for example, the dispersing agent may be obtained by precipitating in a basic medium the desired hydroxide from the corresponding metallic chloride.

When treating heavy residues containing the same amount of chlorine, the sulfur amount of the organic obtained polysulfides increases with the sulfur rank of the used mineral polysulfide.

According to the present invention, organic polysulfide polymers containing from 4 to 45–50% by weight of sulfur are produced by reacting mineral polysulfides of average sulfur rank preferably of more than 1 and up to and including 2.7 with a heavy residue. The produced oragnic polysulfide polymers which are "miscible" with certain solvents such as 1,2 dichloroethane and benzene are in the form of a black soft product. The term miscible means that a single apparent phase is obtained when polysulfide polymer is mixed with the solvent in equal amounts by weight at room temperature and by stirring for 30 minutes. Organic polysulfide polymers containing less than 45–50% by weight of sulfur are soluble at room temperature in carbon disulfide but are insoluble in ethyl alcohol and in acetic acid, acetone and white spirits. Acid or saline solutions do not chemically attack these polymers, and prolonged contact does not cause swelling.

According to the present invention, organic polysulfide polymers containing from 50 to 80% by weight of sulfur are produced by using mineral polysulfides of average sulfur rank preferably higher than 3.4. When polymers contain about 50 to 60% by weight of sulfur, they are in a black mastic form and they can be stretched without breaking like "chewing gum" but they do not rebound to their initial dimensions when the stretching is stopped. When the amount of sulfur is increased, the resultant products become less and less elastic and they even break when they contain more than 60% by weight of sulfur. These polymers, containing a large amount of sulfur, are not miscible in 1,2 dichloroethane and in benzene, and they are not soluble in conventional organic solvents (acetone, ethyl alcohol, etc.). Like polymers containing a lower amount of sulfur they are highly resistant to acid or saline solutions.

According to the present invention, various polymers may be prepared which are suitable for many different applications. Polysulfide polymers containing less than 45% by weight of sulfur are miscible in 1-2 dichloroethane and benzene and are suitable for the manufacture of weather-proof and acid or salt-proof paints and for the impregnation of porous materials. The polysulfide polymers containing more than 50% by weight of sulfur have an excellent adhesiveness for materials such as metals, concrete, stone, wood and due to this property, they can be used as sealants, caulking materials, coating materials, etc.

By adding adjuvants such as for example plasticizers, pigments, siccative substances, the properties of the polymers may be changed in a usual manner.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A heavy residue from the manufacture of vinyl chloride prepared according to oxychlorination process was analysed by using vapor phase chromatography. The heavy residue had the following composition by weight: 47.77% of 1,1,2-trichloroethane, 11.19% of 1,2 dichloroethane, 5.4% of 1,1,12 tetrachloroethane, 3.23% of 1,1,2,2 tetrachlorethane, 4.4% of 1,3-dichlorobutene-2, 3.46% of tetrachloroethylene, 1.65% of chlorobenzene and 0.76% of 1-chloro 2-bromo ethane. The following compounds were also found: chlorinated and polychlorinated derivatives of methane, ethane, ethyl alcohol, acetaldehyde, dimethylether, ethylene, propane, propylene, butane, butene, butadiene, cyclohexadiene, benzene, xylene and little amounts of brominated, polybrominated and chlorobrominated derivatives of ethane and ethylene. By using the method of WURZSCHMITT and ZIMMERMAN (Fortschr.d.-Chem. Forschung I, 485–507, 1950) it was determined that the whole amount of chlorine of this residue was equal to 65.22% by weight. The amount in mineral chlorine was equal to 0.25% by weight in hydrogen chloride form and 0.04% in free chlorine form; so, by difference, the organic chlorine amount was equal to 64.93%.

In a reaction vessel (10 liters) provided with a stirrer, a dropping funnel, a condenser, a thermometer and a heating apparatus, 437.7g of sodium polysulfide having a rank of sulfur equal to 2.9 were prepared by the following process. 390g of technical sodium sulfide containing 63% by weight of $Na_2S$ (measured iodometric titration) and 192g of sulfur were mixed. The mixture volume was adjusted at 4 liters by adding water and the reaction medium was heated at 75° C. with stirring until the solution was homogeneous.

48g of crystallized magnesium chloride, 32g of 50% NaOH solution and 185g of the hereinabove heavy residue were added. The amount of polysulfide employed in comparison with the organic chlorine is equal to 185.8% by weight based on the molar theoretical quantity. The polysulfide addition was achieved in 30 minutes. The reaction medium was heated by stirring at 90° C. for 4 hours and at 98° C. for 1 hour. A precipitate was obtained which was well dispersed in the aqueous phase.

The reaction mother liquor was separated and the polymer was washed by reslurrying with water and stirring at room temperature for 2 hours; then the polymer was decanted. A second washing was achieved by using water, and after decantation and separation of the aqueous phase, 1 liter of water was added. The reaction medium was acidified with a hydrogen chloride solution in an amount sufficient to reach a pH value of 1. A coagulated product was obtained. After decantation for 3 hours, mixing and drying at 50° C., there was obtained 158g of a black pasty product.

This product was analyzed in the Universal IKA bomb according to the method of WURZSCHMITT. It contained 38.8% by weight of sulfur and 7.0% of chlorine.

The resultant product was miscible in 1,2-dichloroethane and in benzene. It was not soluble in ethyl alcohol, acetic acid, acetone and white spirits. It was soluble in carbon disulfide.

EXAMPLE 2

Example 1 was repeated by treating the same heavy residue but by using a sodium polysulfide having a rank of sulfur equal to 3.85. After treatment, there were obtained 237g of a black, breakable plastic material which was not miscible in 1-2 dichloroethane and in benzene. By analysis, it was determined that the product contained 65.8% by weight of sulfur and 6.1% by weight of chlorine.

EXAMPLE 3

Example 2 was repeated with a sodium polysulfide having a sulfur rank equal to 3.2. After treatment, there were obtained 196.1g of a black elastic mastic which can be stretched without breaking. The obtained polymer was not miscible in 1,2-dichloroethane and in benzene. The following results were obtained after immersion of samples of this polymer in different aqueous solutions.

| Nature of the aqueous solution | | After 2 hours | After 1 day | After 4 days | After 2 months |
| --- | --- | --- | --- | --- | --- |
| NaOH | 10% | 0 | 0 | 0 | 1 |
| KOH | 10% | 0 | 0 | 0 | 1 |
| KCl | 10% | 0 | 0 | 0 | 0 |
| H$_2$SO$_4$ | 10% | 0 | 0 | 0 | 0 |
| HCl | 10% | 0 | 0 | 0 | 0 |
| NaOH | 50% | 0 | 0 | 0 | 1 |
| KOH | 50% | 0 | 0 | 1 | 1 |
| Saturated solution of KCl | | 0 | 0 | 0 | 0 |
| H$_2$SO$_4$ | 98% | 1 | 1 | 2 | 2 |
| HCl | 30% | 0 | 0 | 0 | 0 |

0: no change
1: little change
2: large change
3: complete destruction of the product.

When a result 0 was obtained, no apparent swelling of the polymer was observed.

By analysis, it was determined that the product contained 57.3% by weight of sulfur and 5.9% by weight of chlorine.

EXAMPLE 4

The analysis of another heavy residue from the manufacture of vinyl chloride prepared according to the oxychlorination process was achieved by vapor phase chromatography. The heavy residue had the following composition by weight: 11.10% of 1,2-dichloroethane, 9.29% of 1,1,1,2-tetrachloroethane, 6.87% of 1,3-dichloro 2-butene, 5.72% of tetrachloroethylene, 3.51% of 1,1,2,2 tetrachloroethane, 1.75% of chlorobenzene and 1.36% of 1-chloro 2-bromoethane and the other compounds already hereinabove cited in Example 1. The residue was analyzed in the universal IKA bomb. It contained 65.025% by weight of chlorine. The amount of mineral chlorine in hydrogen chloride form was equal to 0.22% by weight and 0.035% in free chlorine form. Then organic chlorine amount was equal to 64.77 percent by weight.

18.5g of this heavy residue was treated according to the operating technique of Example 1 by using sodium polysulfide solutions obtained with technical sodium sulfide containing 61.66% of Na$_2$S, as analyzed by iodometric titration. Table 1 sets forth the starting materials and amounts and analysis of the obtained products.

Table 1

| x of Na$_2$S$_x$ | percent by weight of Na$_2$S in comparison with the molar theoretical quantity | Amount of the obtained polymer (g) | Percent by wt. of sulfur of the obtained polymer | Percent by wt. of chlorine of the obtained polymer |
| --- | --- | --- | --- | --- |
| 2 | 65 | 8 | 42.99 | 8.1 |
| 3 | 65 | 6.1 | 61.87 | 6.2 |
| 5 | 65 | 17.6 | 74.46 | 5.4 |

Among the three obtained polymers, only the polymer containing 42.99% by weight of sulfur is miscible in 1,2-dichloroethane and in benzene.

EXAMPLE 5

18.5g of the residue used in Example 1 were treated according to an identical process, i.e. by achieving the reaction in the presence of magnesium hydroxide but by using a sodium polysulfide of sulfur rank equal to 4 in amount equal to 120% by weight based on the molar theoretical quantity.

The reaction was repeated but magnesium hydroxide was not used. When the reaction was completed, a polymer was obtained which was in a less divided form than when magnesium hydroxide was used and it was difficult to separate the product. Table 2 gives the amounts and the composition of the obtained polymers.

Table 2

| | Amount of obtained polymer (g) | Percent by wt. of S of the obtained polymer | Percent by wt. (Cl) of the obtained polymer |
| --- | --- | --- | --- |
| Reaction with magnesium hydroxide | 26.9 | 64.65 | 5.1 |
| Reaction without magnesium hydroxide | 21.4 | 63.96 | 5.5 |

EXAMPLE 6

The vapor phase chromatography analysis of a heavy residue from the manufacture of the vinyl chloride was: 10.33% of 1,2-dichloroethane, 35.30% of 1,1,2-trichloroethane, 6.88% of tetrachloroethane. Other chlorinated organic compounds were found, in particular, the chlorinated derivatives of 1,3 dichloropropene, 2-chloroethanol, 1,2-dichlorobutane. The residue contained 0.26% of hydrogen chloride and 0.04% of free chlorine. The amount of organic chlorine was equal to 64.93%. 18.5g of this heavy residue were treated with polysulfides of average different ranks of sulfur by using the operating technique of Example 1. The treatments were achieved by using a polysulfide amount equal to 100% by weight of the molar theoretical quantity. Table 3 sets forth the results. Resultant polysulfides of sulfur rank comprised within 1.7 to 3 were miscible in dichloroethane.

Table 3

| x of Na$_2$S$_x$ | Amount of obtained polymer (g) | % by wt. of S of the obtained polymer | % by wt. of Cl of the obtained polymer |
| --- | --- | --- | --- |
| 1.7 | 5.8 | 13.2 | 12.2 |
| 2.3 | 4.6 | 17.5 | 10.9 |

Table 3-continued

| x of $Na_2S_x$ | Amount of obtained polymer (g) | % by wt. of S of the obtained polymer | % by wt. of Cl of the obtained polymer |
|---|---|---|---|
| 3.0 | 10.1 | 25.9 | 9.3 |
| 4.0 | 15.5 | 46.7 | 7.5 |

EXAMPLE 7

Example 6 was repeated but the reaction was achieved without magnesium hydroxide. Table 4 sets forth the obtained results. Polysulfide polymers obtained by using sodium polysulfides of average rank in sulfur comprised within 1 to 3 were miscible in dichloroethane. Polysulfide polymer obtained by using sodium polysulfide of average rank in sulfur equal to 4 was not miscible in dichloroethane and had the consistency of an elastic product.

By comparing Table 3 with Table 4, it is noted, all other things being equal, that when molar theoretical quantities of sodium polysulfides are used, polymers obtained in the presence of a dispersing agent (Table 3) contain less sulfur than polymers prepared without dispersing agent (Table 4).

Table 4

| x of $Na_2S_x$ | Amount of obtained polymer (g) | % by wt. of sulfur of obtained polymer | % by wt. of Cl of obtained polymer |
|---|---|---|---|
| 1.0 | 4.4 | 14.1 | 14.7 |
| 1.7 | 5.3 | 18.4 | 11.0 |
| 2.3 | 7.3 | 19.3 | 9.5 |
| 3.0 | 11.6 | 41.8 | 7.4 |
| 4.0 | 20.8 | 59.6 | 6.0 |

EXAMPLE 8

Examples 6 and 7 were repeated by using an amount of sodium polysulfides equal to 120% by weight of the molar theoretical quantity. Table 5 tabulates the obtained results both in the presence of a dispersing agent (magnesium hydroxide) and in the absence of a dispersing agent.

Polymers prepared by using sodium polysulfides of average rank in sulfur comprised within 1 to 3 are miscible in dichloroethane. It can be seen from Table 5 that when amounts of sodium polysulfides higher than the stoichiometric quantities were used, polymers obtained in the presence of a dispersing agent (magnesium hydroxide) contained more sulfur than polymers produced without dispersing agent.

Table 5

| x of $Na_2S_x$ | Amount of obtained polymer (g) | % S by wt. of the obtained polymer | % Cl by wt. of the obtained polymer |
|---|---|---|---|
| With dispersing agent (magnesium hydroxide) | | | |
| 1.0 | 5.4 | 5.3 | 11.9 |
| 2.0 | 9.2 | 21.3 | 8.8 |
| 2.5 | 5.2 | 38.0 | 12.2 |
| 3.0 | 9.2 | 42.0 | 9.8 |
| 4.0 | 26.9 | 64.6 | 5.1 |
| Without dispersing agent | | | |
| 1.0 | 6.5 | 4.9 | 6.9 |
| 1.5 | 3.5 | 8.3 | 11.6 |
| 2.0 | 7.8 | 17.5 | 9.1 |
| 2.5 | 8.5 | 19.2 | 8.5 |
| 3.0 | 5.7 | 25.9 | 9.9 |
| 3.5 | 20.0 | 58.6 | 6.4 |
| 4.0 | 21.4 | 63.9 | 5.5 |

EXAMPLE 9

Using the method of Example 1, the same heavy residue as Example 1 was treated. Sodium polysulfides of different rank sulfur were used in varying amounts, and Table 6 sets out the results.

Polymers containing less than 45% by weight of sulfur were miscible in dichloroethane.

Table 6

| Percent by weight of $Na_2S_x$ used in comparison with the molar theoretical quantity | x of $Na_2S_x$ | Amount of the obtained polymer (g) | Percent by weight of sulfur of the obtained polymer | Percent by weight of Cl of the obtained polymer |
|---|---|---|---|---|
| 135 | 3.2 | 17.2 | 50.9 | 7.6 |
| 135 | 4.0 | 20.6 | 63.6 | 6.1 |
| 150 | 2.5 | 8.2 | 32.6 | 6.4 |
| 150 | 3.5 | 12.0 | 48.4 | 6.6 |
| 170 | 2.9 | 11.7 | 42.2 | 11.6 |
| 170 | 3.4 | 15.1 | 55.0 | 9.8 |
| 170 | 3.8 | 18.5 | 65.9 | 5.6 |
| 180 | 2.9 | 8.7 | 43.4 | 10.6 |
| 180 | 3.4 | 13.5 | 57.9 | 10.1 |
| 180 | 3.8 | 18.6 | 60.1 | 6.4 |
| 191 | 2.9 | 20.1 | 22.4 | 6.5 |
| 191 | 3.2 | 10.5 | 49.2 | 12.1 |
| 191 | 3.8 | 19.4 | 73.6 | 4.7 |
| 211 | 2.9 | 14.4 | 33.0 | 8.8 |
| 211 | 3.4 | 15.1 | 56.6 | 5.0 |
| 211 | 3.8 | 20.0 | 68.7 | 4.7 |

EXAMPLE 10

18.5g of the heavy residue used in Example 4 were treated according to the same mode of operation. Sodium polysulfides of sulfur rank equal to 5 were used with varying amounts lower than the molar theoretical quantity, the results being indicated in Table 7.

Table 7

| % by wt. of $Na_2S_x$ used in comparison with the molar theoretical quantity | Amount of the obtained polymer (g) | % by wt. of sulfur of the obtained polymer | % by wt. of Cl of the obtained polymer |
|---|---|---|---|
| 80 | 22.0 | 63.0 | 3.0 |
| 65 | 17.6 | 74.4 | 5.4 |
| 50 | 10.1 | 50.5 | 9.1 |
| 30 | 12.1 | 54.0 | 6.3 |
| 10 | 3.1 | 37.6 | 14.8 |

Table 7 shows that by using quantities of sodium polysulfides lower than 30% by weight of the stoichiometric quantity, a relatively small amount of polymers containing a large amount of chlorine were obtained. Only the polymer containing 37.6% by weight of sulfur is miscible in 1-2 dichloroethane.

EXAMPLE 11

The gas chromatographic analysis of a heavy residue from the manufacture of the vinyl chloride prepared according to oxychlorination process was by weight: 28.35% of 1,1,2-trichloroethane, 15.82% of 1,2-dichloroethane, 8.91% of 1,1,1,2-tetrachloroethane, 7.24% of tetrachloroethylene, 5.35% of 1,3-dichloro 2-butene, 3.21% of 1,1,2,2-tetrachloroethane, 1.72% of chlorobenzene, 0.82% of 1-chloro 2-bromoethane, and those other compounds mentioned in example 1. The residue was analysed in the universal IKA bomb. It contained 60.43% by weight of chlorine. The amount of mineral chlorine in hydrogen chloride form was equal to 0.23% by weight, and in free chlorine form, 0.04% by weight. Accordingly, the organic chlorine amount was equal to 60.16% by weight.

By using the method of Example 1, 18.5g of this residue were treated, the reaction being conducted without a dispersing agent. The sodium polysulfides solutions employed were obtained by using technical sodium sulfide containing 63% by weight of $Na_2S$ (titration determined by iodometry). Table 8 indicates the amounts of reactants and amounts of S and Cl contained in the obtained polymers.

glass electrode and a calomel electrode as reference electrode. Table 9 gives the results.

Table 9

| pH at the end of the reaction | Amount of obtained polymer (g) | % by wt. of sulfur of the obtained polymer | % by wt. of chlorine of the obtained polymer |
|---|---|---|---|
| 11.2 | 3.9 | 13.3 | 15.7 |
| 9.2 | 11.2 | 39.3 | 8.8 |
| 8.9 | 10.5 | 40.7 | 8.6 |
| 8.8 | 13.9 | 49.3 | 7.0 |

It is noted that a very small amount of polymer containing a small amount of sulfur and a large amount of chlorine was obtained when pH was increased at the end of the reaction.

EXAMPLE 13

The heavy residue of Example 4 was treated by using the method of Example 12 but by carrying out the reaction with magnesium hydroxide as a dispersing agent. Sodium polysulfides of average sulfur rank equal to 3 and 3.2 were used. The amounts used were equal to 120, 135 and 186% by weight of the molar theoretical quantity. The reaction was conducted by making changes in pH at the end of the reaction.

Table 10, containing the results, shows clearly that when the pH is higher than 10.5, the amounts of obtained polymer are small and the sulfur content of these polymers clearly decreases.

Table 10

| Percent by weight of used $Na_2S_x$ in comparison with the molar theoretical quantity | x of $Na_2S_x$ | pH | Amount of obtained polymer (g) | Percent by weight of sulfur of the obtained polymer (g) | Percent by weight of chlorine of the obtained polymer (g) |
|---|---|---|---|---|---|
| 120 | 3.0 | 9.1 | 11.9 | 63.8 | 8.4 |
| " | " | 9.3 | 11.0 | 57.4 | 6.4 |
| " | " | 9.6 | 11.0 | 54.7 | 7.6 |
| " | " | 10.8 | 2.7 | 40.3 | 10.4 |
| 135 | 3.2 | 9.5 | 11.3 | 68.5 | 4.7 |
| " | " | 10.1 | 9.8 | 61.1 | 5.6 |
| " | " | 10.6 | 2.5 | 35.6 | 11.5 |
| 186 | 3.0 | 9.9 | 11.4 | 56.7 | 6.1 |
| " | " | 10.7 | 5.6 | 47.8 | 10.2 |
| " | " | 11.4 | 0.9 | — | — |

Table 8

| x of $Na_2S_x$ | % by wt. of $Na_2S_x$ used by comparison with the theoretical molar quantity | Amount of obtained polymer (g) | % by wt. of S of the obtained polymer | % by wt. of Cl of the obtained polymer |
|---|---|---|---|---|
| 2.5 | 100 | 15.4 | 35.5 | 6.4 |
| 3.5 | 100 | 21.9 | 51.6 | 5.0 |
| 2.9 | 186.3 | 16.7 | 50.2 | 5.1 |
| 3.85 | 186.3 | 24.6 | 66.2 | 3.2 |

EXAMPLE 12

The heavy residue used in Example 1 was treated by using the same method but the reaction was conducted without a dispersing agent. Sodium polysulfide of sulfur rank equal to 3 was used with an amount equal to 100% by weight of the molar theoretical quantity. The reaction conditions were varied by changing the pH at the end of the reaction. The pH was determined in the reaction mother liquor cooled to 20° C. after decantation of the organic polysulfide polymer, and pH values were measured by using pH meters provided with a

EXAMPLE 14

The example 3 was repeated but after decantation and separation of the aqueous phase and addition of water, the reaction medium was treated with sodium hydrosulfide (NaHS) and sodium sulfite ($Na_2SO_3$) before acidifying with a hydrogen chloride solution up to pH of 1. The reaction medium was treated with 150g of $Na_2SO_3$ and 15g of NaHS at 85° C for 1 hour. After repeated washings the reaction medium was acidified with a hydrogen chloride solution in an amount sufficient to reach a pH value of 1 as in example 3. After decantation mixing and drying there was obtained a product which had the same composition as the product obtained in example 3. This example shows that the polysulfide polymer did not react with the mixture of NaHS and $Na_2SO_3$.

EXAMPLE 15

The example 6 was repeated by using 18.5g of the heavy residue and polysulfide having a rank of sulfur equal to 3 used in amount equal to 100% by weight of the molar theoritical quantity. As in the example 14, the reaction medium was treated before acidification with Na$_2$SO$_3$ (15g) and NaHS (1.5g). After washing, acidification, decantation, mixing and drying there was obtained a product which had the same composition as the product obtained in example 6 when polysulfide of rank of sulfur equal to 3 was used.

EXAMPLE 16

Example 8 was repeated by using sodium polysulfides having a rank in sulfur equal to 3 and 4 in amount equal to 120% by weight of the molar theoritical quantity and by achieving the reaction in the presence of a dispersing agent (magnesium hydroxide). As in example 15, the reaction mediums were treated before acidification with the mixture constituted by Na$_2$SO$_3$ (15g) and NaHS (1.5g). After treatment there were obtained products which had the same composition as products obtained in example 8 when sodium polysulfides having a rank of sulfur equal to 3 and 4 were used.

EXAMPLE 17

100g of a commercial polysulfide sold by Thiokol Chemical Corporation under the trade mark L.P.2 Thiokol was reacted with 15g of an mixture constituted by lead peroxide (7.5g), stearic acid (0.75g) and dibutyl phtalate (6.75g). The polysulfide is hardened after 20 hours.

By way of comparison 100g of the polymer obtained in example 1 was treated with the same accelerator mixture. The polymer did not react and was not hardened after 20 hours.

EXAMPLE 18

100g of the polysulfide polymer obtained in example 1 were mixed with 60g of 1,2 dichloroethane at room temperature and by stirring for 30 minutes. 60g of a isocyanate product sold under trade mark "DESMODUR VL" by the firm Farbenfabriken Bayer A.G. were added to the mixture. A pigment iron oxide was added. The obtained product was applied by brushing on a metal under the form of a 30 microns ($\mu$) film. The film hardened after 12 hours. ("Desmodur VL" is an aromatic diisocyanate product having a proportion of NCO of about 30%. This liquid product has a viscocity of about 130 ± 25 centipoises (25° C), and its density is equal to 1.22 g/cm$^3$ (20° C).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for abating a waste disposal problem in the manufacture of vinyl chloride wherein 1,2 dichlorethane is an intermediate and a heavy residue is recovered as still bottoms, from the purification by distillation of dichloroethane and/or vinyl chloride having an organic-origin chloride content ranging between 55 and 80% by weight, said process comprising reacting said heavy residue at 50° to 100° C., in aqueous medium with an alkali metal or an alkaline earth metal polysulfide, the proportion of polysulfide being equal at least to 30% by weight of the molar theoretical quantity, the average sulfur rank of polysulfide being more than 1 and up to and including 5, the pH of the reaction medium not exceeding 10.5 when the reaction is completed, and the obtained precipitate being separated from the reaction mother liquor, said precipitate being organic polysulfide polymers containing 4–80% by weight of sulfur.

2. A process according to claim 1, wherein the alkali metal polysulfide is a sodium polysulfide obtained by reacting sodium sulfide with sulfur.

3. A process according to claim 1, wherein the heavy residue and the polysulfide are mixed at 50° to 80° C. and the reaction is terminated at a temperature of about 90°–100° C.

4. A process according to claim 1, wherein the reaction is achieved in the presence of a dispersing agent.

5. A process according to claim 4, wherein the dispersing agent is iron, aluminum or magnesium hydroxide.

6. A process according to claim 4, wherein the dispersing agent is magnesium hydroxide obtained in situ from magnesium chloride.

7. A process according to claim 1, wherein the precipitate is washed with water in order to separate the soluble impurities, slurried in water and coagulated by acidification of the reaction medium at a pH below 5.

8. A process according to claim 1, wherein the organic polysulfide polymers contain from 4 to 50% by weight of sulfur and the average rank is between 1 and up to and including 2.7.

9. A process according to claim 1, wherein the organic polysulfide polymers contain from 50 to 80% by weight of sulfur and the average sulfur rank is between 3.4 to 5.

10. Polysulfide polymer obtained according to claim 1.

11. Polysulfide polymer obtained according to claim 3.

12. Polysulfide polymer obtained according to claim 7.

13. Polysulfide polymer obtained according to claim 8.

14. Polysulfide polymer obtained according to claim 9.

15. A coating composition comprising the polysulfide polymer of claim 13 dispersed in a solvent in which said polysulfide polymer is miscible.

16. A coating composition according to claim 15, further comprising pigment.

* * * * *